United States Patent [19]

Kremheller

[11] 4,368,036

[45] Jan. 11, 1983

[54] KILN FOR FIRING CERAMIC WORKPIECES

[75] Inventor: Hermann Kremheller, Nuremberg, Fed. Rep. of Germany

[73] Assignee: Ludwig Riedhammer GmbH & Co. KG, Nuremberg, Fed. Rep. of Germany

[21] Appl. No.: 281,192

[22] Filed: Jul. 7, 1981

[30] Foreign Application Priority Data

Jul. 8, 1980 [DE] Fed. Rep. of Germany ....... 3025801

[51] Int. Cl.³ .............................. F27B 9/00; F27B 5/04
[52] U.S. Cl. ..................................... 432/146; 432/131; 432/137; 432/144; 432/148; 432/205
[58] Field of Search ............... 432/121, 122, 126, 131, 432/137, 144, 146, 148, 196, 205

[56] References Cited

U.S. PATENT DOCUMENTS

| | | |
|---|---|---|
| 1,214,217 | 1/1917 | Plante .................... 432/144 |
| 2,540,806 | 2/1951 | Berger, Jr. ............. 432/196 |
| 3,108,351 | 10/1963 | Hermans ............... 432/196 |
| 3,726,515 | 4/1973 | Knaak .................... 432/196 |
| 4,005,981 | 2/1977 | Turnbull ................ 432/146 |
| 4,012,190 | 3/1977 | Dicks et al. ........... 432/146 |

*Primary Examiner*—John J. Camby
*Attorney, Agent, or Firm*—Spencer & Kaye

[57] ABSTRACT

In a kiln for firing ceramic workpieces, which kiln is composed of two opposed side walls and a top wall enclosing an elongate kiln chamber, and elements for introducing jets of heating or cooling gases into the kiln chamber at locations spaced along the length of the kiln, the elements are located for directing the jets produced thereby vertically in the region of the side walls of the kiln, and deflector stones are disposed at a distance from the elements for deflecting the jets and gases within the chamber transversely of the length of the kiln.

14 Claims, 2 Drawing Figures

KILN FOR FIRING CERAMIC WORKPIECES

BACKGROUND OF THE INVENTION

The present invention relates to a continuously or periodically operated kiln for firing ceramic workpieces.

As used herein, the term "continuously operated kilns" is understood to mean the so-called tunnel kilns. The term "periodically operated kilns" is understood to mean chamber kilns, shuttle kilns and top-hat kilns.

The present invention can be used to advantage with any of the above-mentioned kiln or furnace types. Merely for reasons of simplicity and in order to avoid repetition, the invention will be described below for the example of a tunnel kiln.

In the known tunnel kilns, the material to be fired is slowly transported through the furnace chamber, for example, by means of tunnel kiln carriages, in the direction of the longitudinal axis of the kiln. The material thus passes through a heating zone, a firing zone and finally a cooling zone. During its entire trip through the furnace, care must be taken that the material to be fired is heated as uniformly as possible in the heating zone, kept at the firing temperature in the firing zone, and cooled down again in the cooling zone. Particularly when the material enters into the heating zone, extreme care must be taken to avoid local overheating, which may occur due to the more or less point-shaped contact of the burner jets on the ceramic workpiece material. To accomplish heating of the entire material in as uniform and gentle a manner as possible, it was necessary in the prior art to arrange the material at a certain distance from the surface of the transporting carriage. This was done by arranging a setting plate on the transporting carriage in a spaced relationship thereto and then stacking the material to be fired on this setting plate. However, this arrangement prevented full utilization of the available kiln volume.

SUMMARY OF THE INVENTION

It is an object of the present invention to improve kilns of the known type so that substantially all of the kiln volume can be utilized for the passage of material to be fired and local overheating is avoided.

The above and other objects are achieved, according to the invention, in a kiln for firing ceramic workpieces, which kiln is composed of two opposed side walls and a top wall enclosing an elongate kiln chamber, and means for introducing jets of heating or cooling gases into the kiln chamber at locations spaced along the length of the kiln, by locating the means for directing the jets produced thereby vertically in the region of the side walls of the kiln, and providing the kiln with deflector stones disposed at a distance from the means for deflecting the jets and gases within the chamber transversely of the length of the kiln.

It is of particular advantage if the firing jets which extend vertically from the top to the bottom are received by lateral guide recesses disposed in the side walls of the kiln. The guide recesses are then advantageously designed in such a manner that their depth decreases from the top toward the bottom so that they gradually merge into the actual kiln chamber. It is also of advantage for the width of the guide recesses to increase from the top toward the bottom in the manner of a diffusor since in this way a gradual transition from the initially very directional burner jets to a uniformly and continuously flowing kiln atmosphere can be realized.

To further augment this effect, it is desirable to dispose apertures for the introduction of additional air in the region of the nozzles or of the high speed burners. This air may possibly be preheated fresh air, or it may be air which has been extracted from the kiln chamber at another location.

At a distance from the openings of the nozzles or of the high speed burners from which the firing jets emerge, there are disposed deflector stones which preferably extend along the kiln length in the manner of a curbstone and are provided with a rounded throat oriented toward the kiln chamber. These deflector stones serve the purpose of deflecting the vertically approaching but now substantially longitudinally homogeneous kiln atmosphere to thus produce a circulating flow of the kiln gases transverse to the longitudinal direction of the kiln. In the region of these deflector stones there may be provided additional nozzles through which more air or more fuel and combustion air are introduced into the interior of the kiln. The main purpose of these additional nozzles is to introduce further kinetic circulation, or rotation, energy into the kiln atmosphere. However, the additional nozzles can also be used to compensate a locally existing heat deficit in which case they are advantageously provided as additional burners.

In order to realize substantially uniform heating of the two heat consuming zones in the kiln, i.e., the heating zone and the firing zone, as well as a likewise uniform cooling in the cooling zone of the kiln, the nozzles or high speed burners are arranged in longitudinal alternation, or are staggered, along the two longitudinal sides of the kiln. In this way, overheating or overcooling on only one side of the kiln can be avoided. The rotational flow developing in the kiln according to the invention also contributes to a uniform temperature distribution.

It has surprisingly been found that due to the proposed measures it is possible, in a kiln according to the invention, to pack the material to be fired down to the bottom of the kiln, i.e. usually to the surface of the transporting carriages. The gap otherwise customarily provided between the bottom of the furnace, i.e. the surface of the transporting carriages and the lower edge of the material being fired or of the setting plate can here be omitted entirely or in part, which results in increased utilization of kiln volume.

The cooling zone of the kiln is equipped, in a manner similar to the heat consuming zones, i.e. the heating zone and firing zone, of the furnace. Instead of high speed burners, air nozzles are there provided which permit the introduction of air into the kiln in a uniform distribution. Here again, the proposed vertical direction of the jets as well as the deflection of flow leads to the formation of a uniform rotational flow which cools the material being fired just as uniformly and gently as it had previously been heated.

DESCRIPTION OF THE PREFERRED EMBODIMENTS

Figure 1:
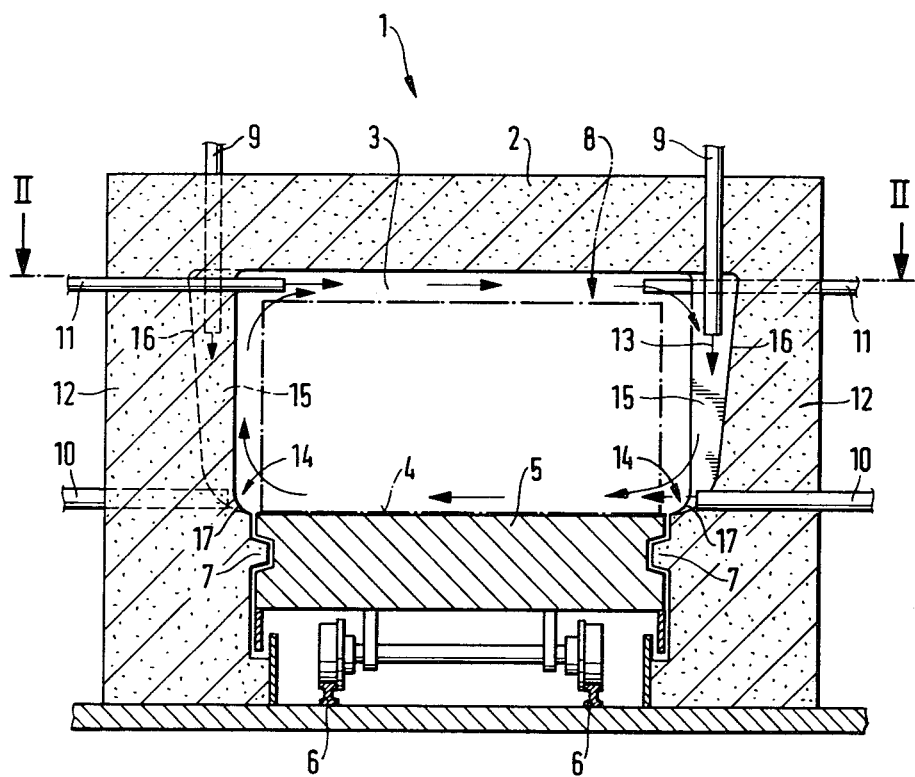
FIG. 1 is a cross-sectional end view showing the basic components of one preferred embodiment of a kiln according to the invention.
Figure 2:
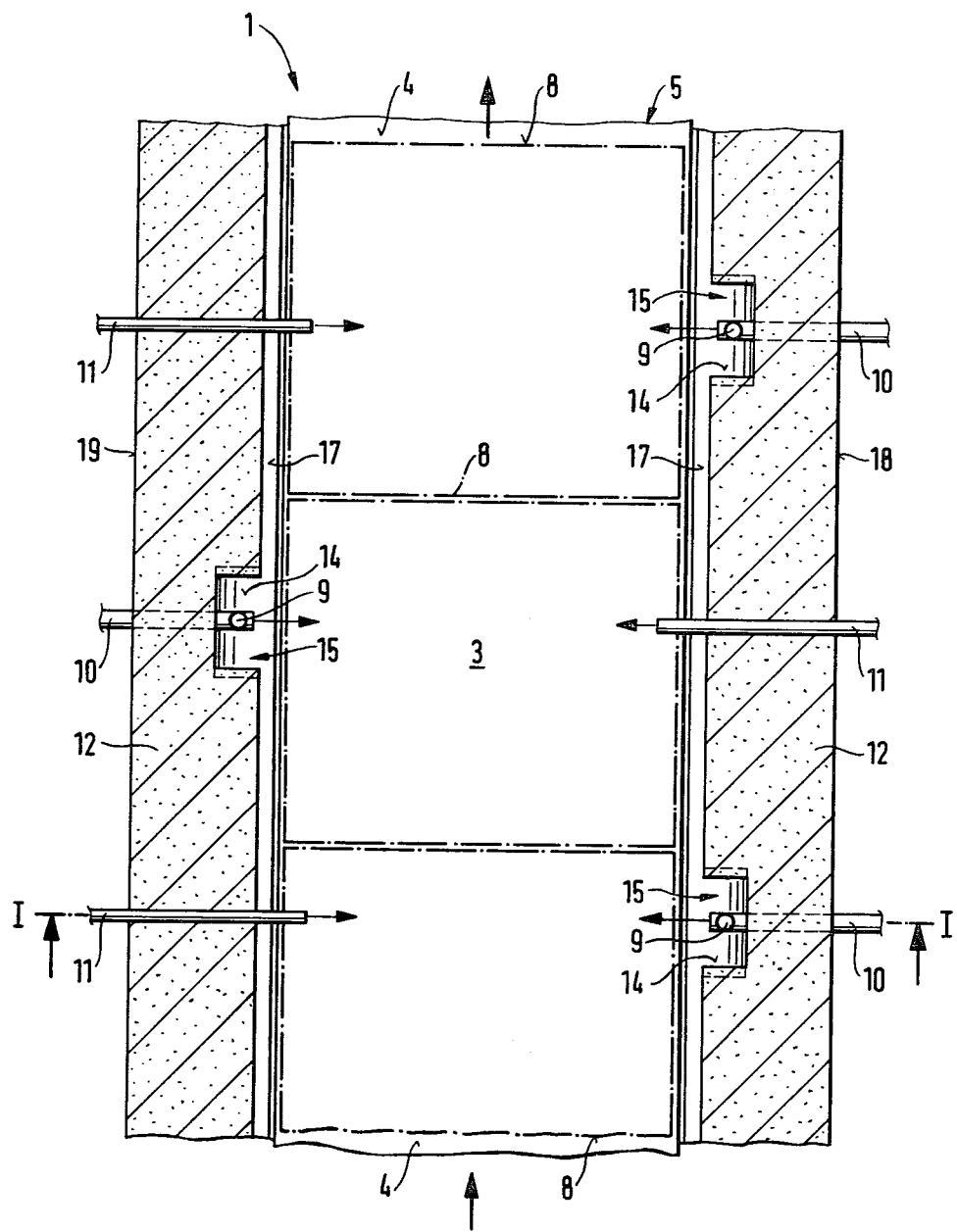
FIG. 2 is a simplified cross-sectional plan view of a portion of the length of the kiln of FIG. 1.

The kiln 1 shown in FIGS. 1 and 2 is composed of longitudinally extending side walls 12 and top wall 2 enclosing the kiln chamber 3. The kiln chamber 3 has an approximately rectangular cross section. In practical embodiments, however, the corners of that cross section may be rounded. The bottom 4 of the kiln is formed by the upper surface of a transporting carriage 5 which moves below the kiln chamber on rails 6. In order to protect the rails and the drive mechanism against the kiln heat, a slide seal 7 is provided, in a known manner, along each side of carriage 5. In the illustrated embodiment, the material 8 to be fired and transported through the kiln is disposed directly on the surface of the transporting carriage 5.

High speed burners 9 are provided for heating and nozzles 10 and 11 are provided for the introduction of fresh air and for cooling.

The tunnel kiln is characterized in that the high speed burners 9 in the heating and firing zones and the similarly oriented air nozzles in the cooling zone are disposed in the region of the side walls 12 of the kiln, that the direction 13 of the jets from these nozzles and high speed burners is oriented vertically from the top to the bottom, and that at a distance from the exit openings of the nozzles or of the high speed burners, guide stones 14 are disposed so as to deflect the kiln gases and the jets transversely to the longitudinal axis of the kiln.

According to a particularly advantageous arrangement, vertical guide recesses 15 for the jets are provided in the lateral kiln walls 12, with the nozzles or high speed burners being disposed in the upper sections 16 of these recesses 15. FIG. 1 shows that the depth of these guide recesses 15, that is the horizontal dimension transverse to the longitudinal axis of the kiln, decreases from the top toward the bottom. Thus the guide recesses form a continuous transition to the kiln chamber. In addition, the width of the guide recesses 15, that is the dimension parallel to the longitudinal axis of the kiln, increases from the top toward the bottom in the manner of a diffusor. All of these measures contribute to transforming the jets, which exit from the nozzle apertures in a concentrated manner, into a uniform kiln atmosphere.

The above-mentioned deflector stones 14 may extend over the entire length of the kiln in the manner of curbstones; they are provided with a rounded throat 17 which is oriented toward the interior of the kiln chamber 3 and contributes to a turbulence free deflection of the furnace atmosphere. Due to the deflector stones extending over the entire length of the kiln, they appear in cross section in FIG. 1 along both side walls of the kiln.

Additional nozzles 10 producing horizontally directed jets may be provided in the region of the deflector stones 14. These additional nozzles may also be high speed burners or nozzles for the introduction of air.

Further additional nozzles, preferably fresh air or kiln air nozzles may also be provided at other suitable locations in the kiln, for example in the region of the ceiling of the kiln, as shown at 11 in FIG. 1. The purpose of these further nozzles 10 and 11 is to introduce kinetic energy to the circulating kiln atmosphere and thus provide a uniform and steady rotation of the kiln atmosphere. Moreover, as already mentioned, a local heat deficit may be compensated by means of these additional nozzles, in which case the additional nozzles must also be burners.

FIG. 2 shows that the nozzles or high speed burners 9 are arranged alternatingly at the two longitudinal sides 18 and 19 of the kiln over its entire length. FIG. 1 illustrates that in the kiln according to the invention, the material 8 to be fired can be packed down to the bottom 4 of the kiln formed by the surface of the transporting carriage 5.

The basic concepts of the present invention can of course also be used for kilns or furnaces in which the material to be fired is not transported through the tunnel with the aid of transporting carriages, but is moved on pushed pallets or also with the aid of rotating chain members or with the aid of rocker bars or walking beams. Such furnaces are generally called channel furnaces and they can also be constructed as embodiments of the present invention.

A typical embodiment of the invention could be a continuously working tunnel kiln with transporting carriages. The length of said kiln is 60 m; the setting width is approx. 170 cm; the setting height is approx. 50 cm. The longitudinal spacing between the burners or nozzles being 200 cm on both lateral sides, the burners or nozzles being furthermore located alternate ones of said two side walls, the longitudinal spacing of the burners or nozzles is 100 cm.

A typical type of burner to be utilized in such kiln could be a high speed burner for air/gas premixture having a nozzle diameter of 25 mm and a jet speed of 80–100 m/sec. It is understood that a variety of other burner types for gas and/or oil firing can also be used.

It will be understood that the above description of the present invention is susceptible to various modifications, changes and adaptations, and the same are intended to be comprehended within the meaning and range of equivalents of the appended claims.

What is claimed is:

1. In a kiln for firing ceramic workpieces, which kiln is composed of two opposed side walls and a top wall enclosing an elongate kiln chamber, and means for introducing jets of heating or cooling gases into the kiln chamber at locations spaced along the length of the kiln, the improvement wherein: said means comprise at least one element selected from the group consisting of nozzles and high speed burners and are located for directing the jets produced thereby vertically downwardly in the region of said side walls of said kiln; and said kiln further comprises deflector stones disposed at a distance from said means for deflecting the jets and gases within said chamber transversely of the length of said kiln, and additional means for producing horizontally oriented jets disposed in the region of said deflector stones.

2. Kiln as defined in claim 1 wherein said side walls are provided with vertical guide recesses for guiding the jets, and said elements are disposed in the upper sections of said guide recesses.

3. Kiln as defined in claim 2 wherein the depth of said guide recesses decreases from the top to the bottom.

4. Kiln as defined in claim 2 or 3 wherein the width of said guide recesses increases from the top to the bottom so that said recesses have the form of a diffusor.

5. Kiln as defined in claim 1 further provided with openings for the introduction of additional diffusion air at the level of said elements.

6. Kiln as defined in claim 1 wherein said deflector stones extend along the length of said kiln in the form of curbstones and are provided with rounded throats which are oriented toward the interior of said chamber.

7. Kiln as defined in claim 1 wherein said additional means are nozzles.

8. Kiln as defined in claim 1 wherein said additional means are burners.

9. Kiln as defined in claim 1 wherein said elements are spaced apart along the length of said kiln, with successive elements being located at alternate ones of said two side walls.

10. Kiln as defined in claim 1 arranged to have the workpieces packed down to the said bottom of said kiln.

11. Kiln as defined in claim 10 further comprising at least one transporting carriage for supporting workpieces and defining the said bottom of said kiln.

12. Kiln as defined in claim 10 further comprising at least one rotating chain member for supporting workpieces and defining the said bottom of said kiln.

13. Kiln as defined in claim 10 further comprising at least one pushed pallet for supporting workpieces and defining the said bottom of said kiln.

14. Kiln as defined in claim 10 further comprising at least one rocker bar or walking beam for supporting workpieces and defining the said bottom of said kiln.

* * * * *